United States Patent
Hwang et al.

(10) Patent No.: US 10,925,081 B2
(45) Date of Patent: Feb. 16, 2021

(54) METHOD FOR TRANSMITTING INFORMATION REGARDING AVAILABLE RESOURCE, AND APPARATUS THEREFOR

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/348,904

(22) PCT Filed: Nov. 13, 2017

(86) PCT No.: PCT/KR2017/012782
§ 371 (c)(1),
(2) Date: May 10, 2019

(87) PCT Pub. No.: WO2018/093103
PCT Pub. Date: May 24, 2018

(65) Prior Publication Data
US 2019/0281622 A1 Sep. 12, 2019

Related U.S. Application Data

(60) Provisional application No. 62/422,544, filed on Nov. 15, 2016, provisional application No. 62/454,868, (Continued)

(51) Int. Cl.
*H04W 72/12* (2009.01)
*H04W 52/58* (2009.01)
*H04W 72/04* (2009.01)

(52) U.S. Cl.
CPC ....... *H04W 72/1289* (2013.01); *H04W 52/58* (2013.01); *H04W 72/04* (2013.01); *H04W 72/121* (2013.01); *H04W 72/1273* (2013.01)

(58) Field of Classification Search
None
See application file for complete search history.

(56) References Cited

U.S. PATENT DOCUMENTS

2015/0208392 A1* 7/2015 Park .................. H04B 7/024
370/329
2017/0201968 A1* 7/2017 Nam .................. H04W 72/042
(Continued)

FOREIGN PATENT DOCUMENTS

WO 2015099889 A1 7/2015

OTHER PUBLICATIONS

InterDigital Communications, "UE Support for Multiple Numerologies for NR", 3GPP TSG-RAN WG1 #86bis, Oct. 10-14, 2016, R1-1610022.
(Continued)

*Primary Examiner* — Brian S Roberts
(74) *Attorney, Agent, or Firm* — Dentons US LLP

(57) ABSTRACT

The present invention discloses a method for a terminal receiving a signal from a base station and a particular communication apparatus in a wireless communication system. Specifically, the method is characterised by the steps of: receiving information regarding an allocated blank resource from the base station in order to receive a first signal for a first wireless communication service; receiving the first signal on the blank resource, and receiving a second signal for a second wireless communication service on resources apart from the blank resource; and decoding one or more of the first signal and the second signal based on the blank resource information.

12 Claims, 9 Drawing Sheets

Related U.S. Application Data filed on Feb. 5, 2017, provisional application No. 62/555,621, filed on Sep. 7, 2017.

(56) References Cited

U.S. PATENT DOCUMENTS

2017/0257860 A1* 9/2017 Nam .................. H04W 72/0446
2017/0332357 A1* 11/2017 Xu ......................... H04W 72/10
2017/0366311 A1* 12/2017 Iyer ....................... H04L 5/0007

OTHER PUBLICATIONS

Huawei, HiSilicon, "DL URLLC multiplexing considerations", 3GPP TSG RAN WG1 Meeting #87, Nov. 14-18, 2016, R1-1611222.
ZTE, ZTE Microelectronics, "About URLLC/eMBB multiplexing", 3GPP TSG RAN WG1 Meeting #87, Nov. 14-18, 2016, R1-1611288.
Samsung, "DL Common Control Signaling", 3GPP TSG RAN WG1 #87, Nov. 14-18, 2016, R1-1612525.

* cited by examiner

FIG. 2
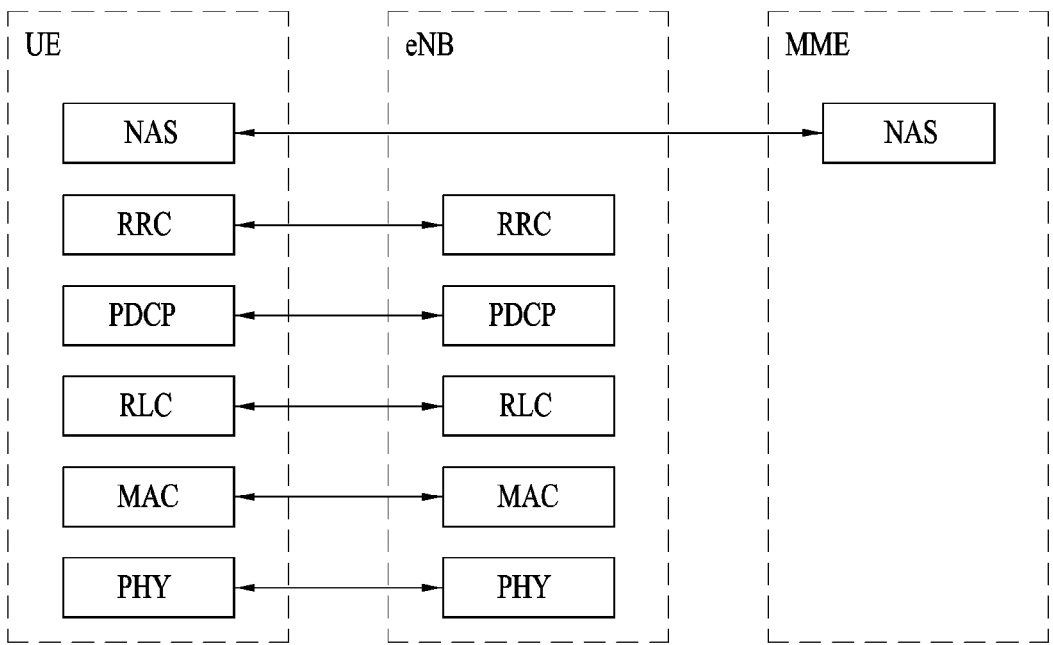
(A) CONTROL-PLANE PROTOCOL STACK
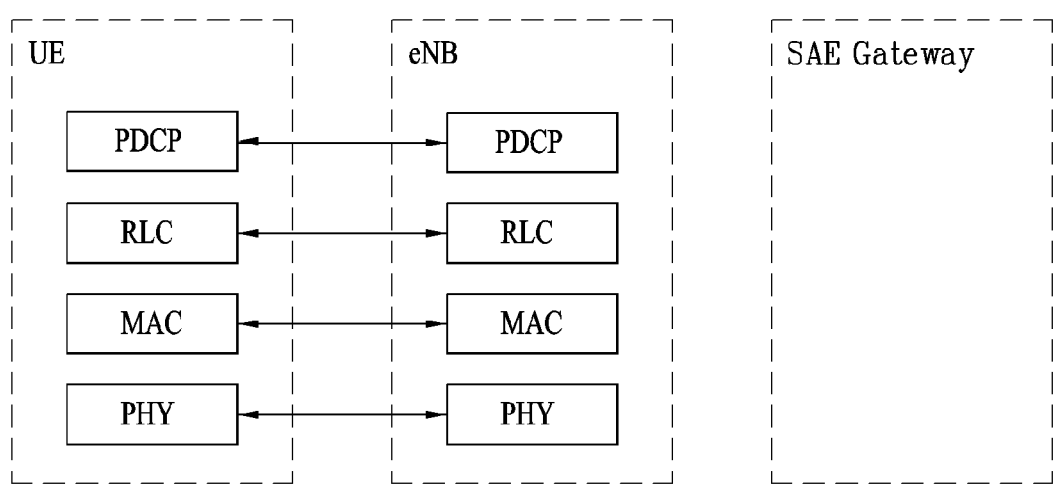
(B) USER-PLANE PROTOCOL STACK

METHOD FOR TRANSMITTING INFORMATION REGARDING AVAILABLE RESOURCE, AND APPARATUS THEREFOR

This application is a National Stage Entry of International Application No. PCT/KR2017/012782 filed Nov. 13, 2017, which claims priority to U.S. Provisional Application Nos. 62/422,544 filed Nov. 15, 2016; 62/454,868 filed Feb. 5, 2017 and 62/555,621 filed Sep. 7, 2017, all of which are incorporated herein by reference.

TECHNICAL FIELD

The present invention relates to a method of transmitting information about an available resource in a wireless communication system and an apparatus therefor. More specifically, the present invention relates to a method of transmitting information about a blank resource within a reference time unit to a user equipment (UE) by a base station (BS) and decoding a radio signal by the UE based on the information and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DETAILED DESCRIPTION OF THE INVENTION

Technical Problems

The present invention provides a method of transmitting information about an available resource in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

According to an aspect of the present invention, provided herein is a method of receiving a signal from a base station (BS) by a user equipment (UE) in a wireless communication system, including receiving, from the BS, information related to a blank resource allocated to receive a first signal for a first wireless communication service; receiving the first signal on the blank resource and receiving a second signal for a second wireless communication service on a resource other than the blank resource; and decoding at least one of the first signal and the second signal based on the information related to the blank resource.

The information related to the blank resource may be transmitted through group-common downlink control information (DCI) which is commonly transmitted to a specific UE group.

A resource region to which the information related to the blank resource is applied may be configured based on a periodicity at which the UE monitors the group-common DCI.

The group-common DCI may include information related to transmission power control (TPC) for the specific UE group and the information related to the blank resource may be indicated by a bit secured by compressing the information related to TPC into a predetermined size.

If a reception timing of the information related to the blank resource is equal to a reception timing of the first signal, the first signal may be received and the information related to the blank resource may be dropped.

The information related to the blank resource may include information related to a position of a starting symbol of the blank resource and a position of an ending symbol of the blank resource.

The information related to the blank resource may be received in a frequency band different from a frequency band in which the first signal is received.

The first wireless communication service may be for ultra-reliable low latency communication (URLLC) and the second wireless communication service may be for communication other than URLLC.

In another aspect of the present invention, provided herein is a user equipment (UE) for receiving a signal transmitted by a base station (BS) in a wireless communication system, including a radio frequency (RF) module configured to transmit and receive a signal to and from the BS and the specific communication device; and a processor connected to the RF module to receive, from the BS, information related to a blank resource allocated to receive a first signal for a first wireless communication service, receive the first signal on the blank resource and receive a second signal for a second wireless communication service on a resource other than the blank resource, and decode the first signal and the second signal based on the information related to the blank resource.

The information related to the blank resource may be transmitted through group-common downlink control information (DCI) which is commonly transmitted to a specific UE group.

A resource region to which the information related to the blank resource is applied may be configured based on a periodicity at which the UE monitors the group-common DCI.

The group-common DCI may include information related to transmission power control (TPC) for the specific UE group and the information related to the blank resource may be indicated by a bit secured by compressing the information related to TPC into a predetermined size.

If a reception timing of the information related to the blank resource is equal to a reception timing of the first signal, the first signal may be received and the information related to the blank resource may be dropped.

The information related to the preempted resource may include information related to a position of a starting symbol of the blank resource and a position of an ending symbol of the blank resource, for reception of the first signal.

The information related to the blank resource may be received in a frequency band different from a frequency band in which the first signal is received.

The first wireless communication service may be for ultra-reliable low latency communication (URLLC) and the second wireless communication service may be for communication other than URLLC.

Advantageous Effects

According to the present invention, a BS can efficiently indicate information about a resource within a reference time unit and a UE can efficiently transmit and receive a signal based on the information.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE FOR CARRYING OUT THE INVENTION

Figure 1:
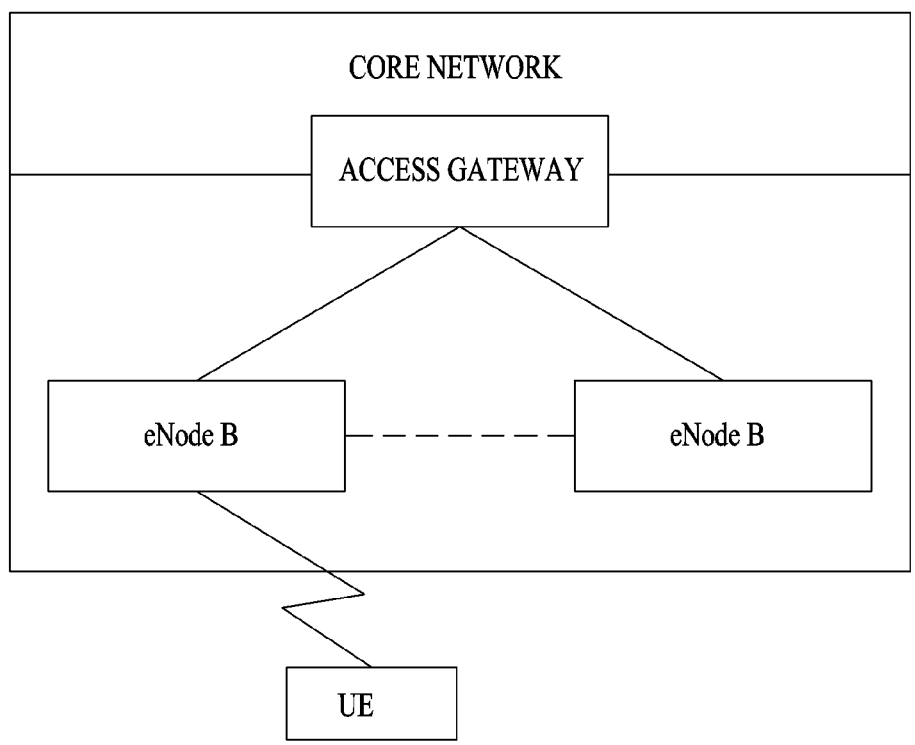
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
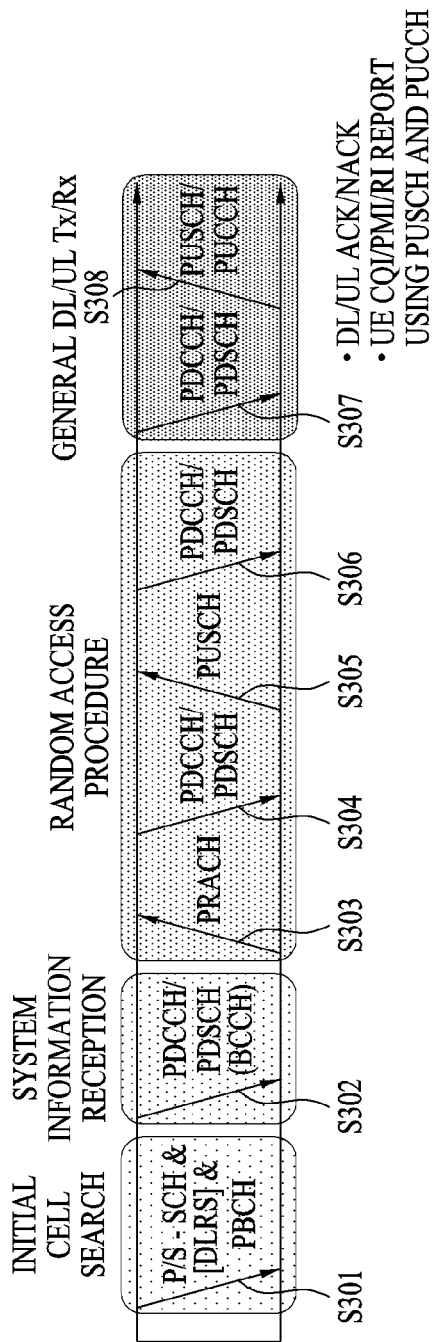
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
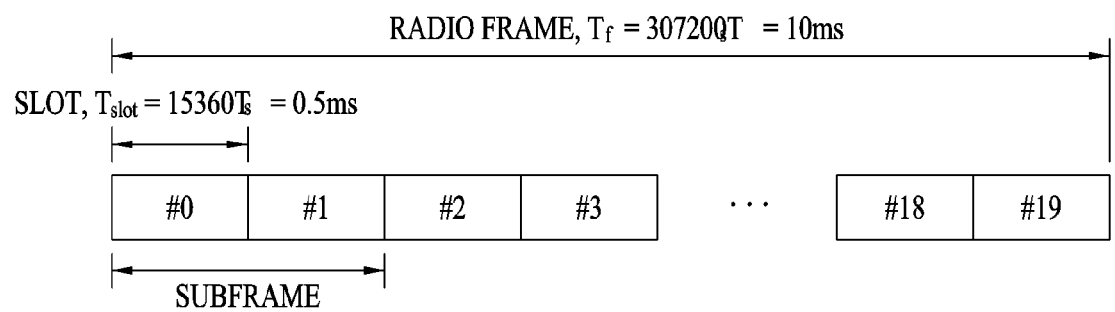
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
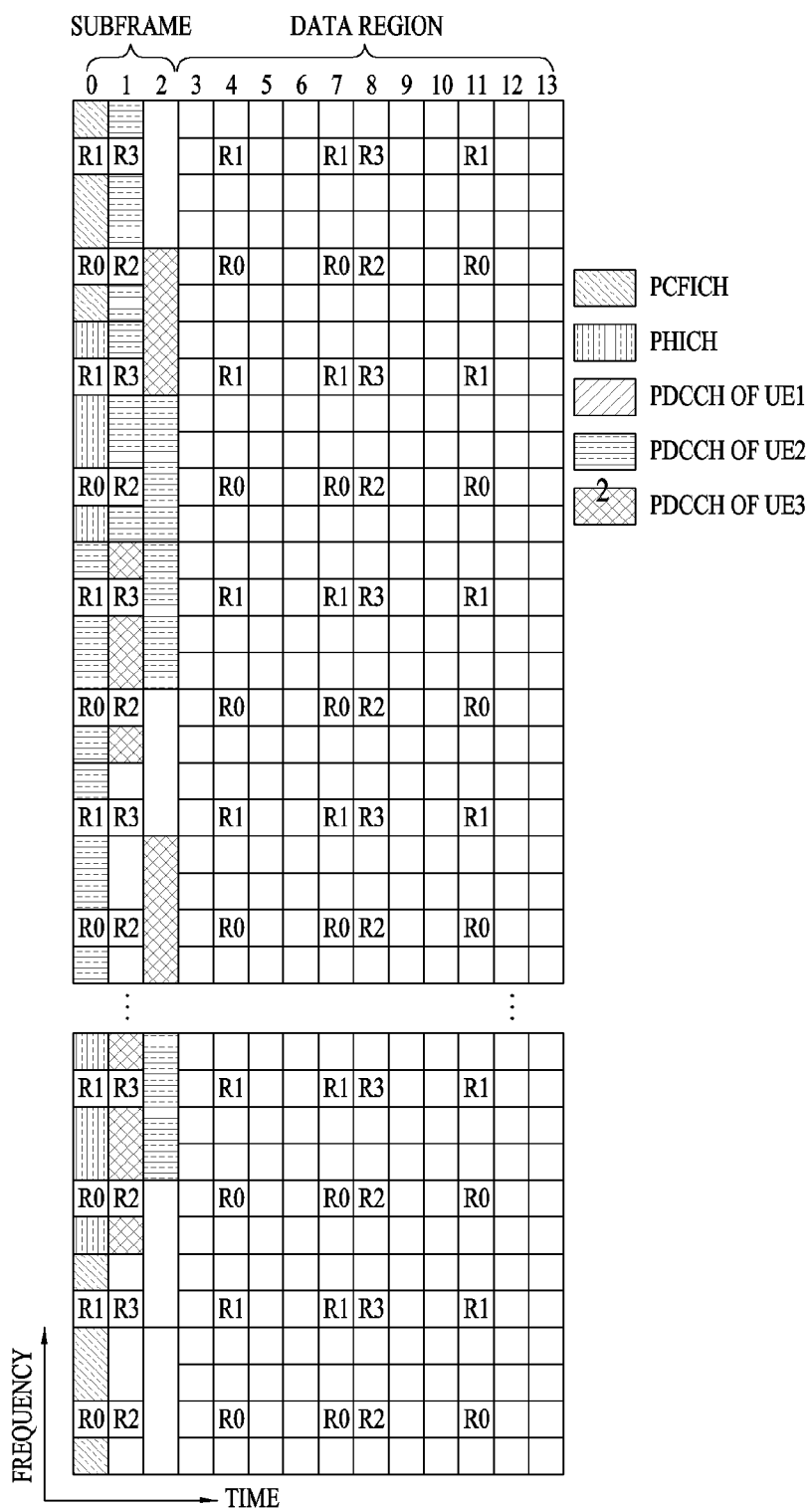
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
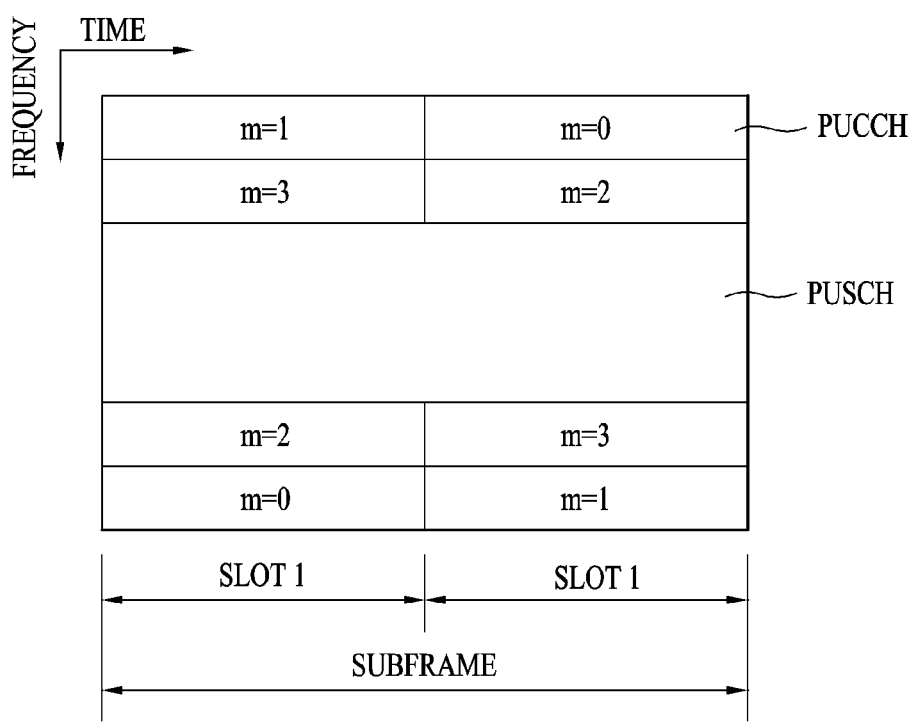
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
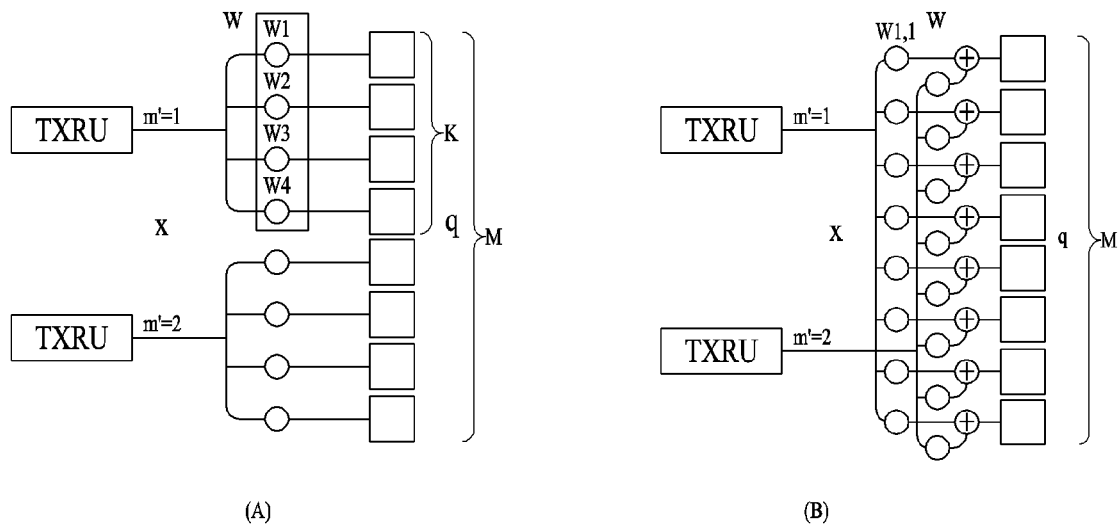
FIG. 7 illustrates examples of a connection scheme between TXRUs and antenna elements.

FIG. 7 illustrates examples of a connection scheme between TXRUs and antenna elements.

FIG. 7 (a) illustrates that TXRU is connected to a sub-array. In this case, the antenna elements are connected to only one TXRU. Unlike FIG. 7 (a), FIG. 7 (b) illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
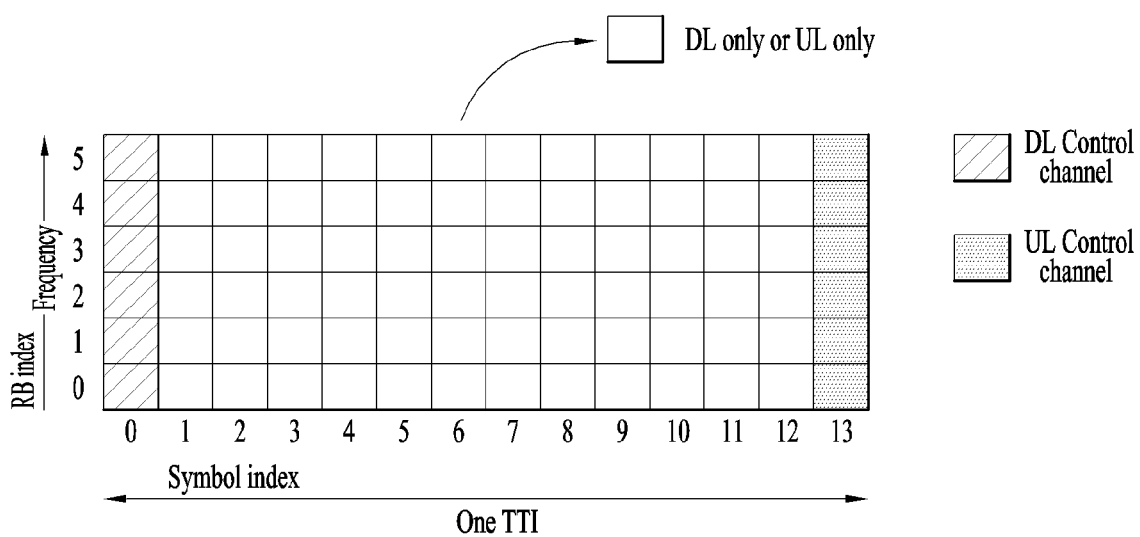
FIG. 8 illustrates an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

Figure 10:
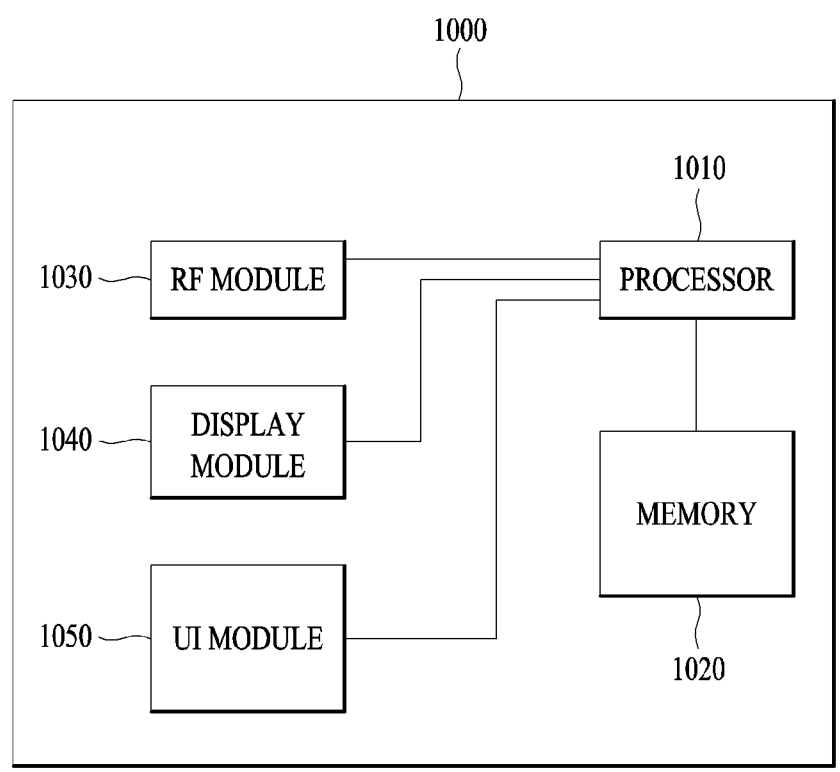
FIG. 10 is a block diagram of a communication device according to one embodiment of the present invention.

In FIG. 10, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are configured to a guard period (GP).

Examples of the self-contained subframe type that may be configured in the system operating based on the NewRAT may consider four subframe types as follows.
 downlink control period+downlink data period+GP+uplink control period
 downlink control period+downlink data period
 downlink control period+GP+uplink data period+uplink control period
 downlink control period+GP+uplink data period In 5G NewRAT, configuration including a DL transmission portion, a GP, and a UL transmission portion within a reference time unit such as a subframe unit, a slot unit, or a mini-slot unit may be considered. The eNB may adjust the UL transmission portion and the DL transmission portion which constitute the reference time unit according to traffic conditions or circumstances. As an example, the eNB may configure a DL-only subframe including only DL signals. If the UL transmission portion is larger than the DL transmission portion, the eNB may configure the reference time unit by a DL signal and a GP, and a UL signal for the purpose of transmitting UL data. However, if the UL transmission portion is smaller than the DL transmission portion, the eNB may configure the reference time unit by a DL signal and a GP, and a UL signal for the purpose of transmitting uplink control information (UCI). Even when the UL transmission portion is smaller than the DL transmission portion, the UL transmission portion may be used to transmit UL data. In a unit time for transmitting or scheduling signals for listen-before-talk (LBT) communication or interference mitigation, a blank resource may be configured in a specific region located at a front part or rear part in the time domain.

The present invention proposes a method of configuring resource information regarding the reference time unit and indicating or signaling the resource information to the UE. For convenience of description, although operation for a slot unit is defined in embodiments, the present invention may be extended and applied to other time reference units. The resource information regarding the reference time unit may indicate a starting or ending position of a control region and/or data region of DL and/or UL and mean information about numerology or the amount and positions of blank resources.

<Method of Configuring Resource Information Regarding Subframe/Slot/Mini-Slot>

In the next-generation system, a specific slot may be used for DL transmission and may be used for UL transmission. Such a link direction may be dynamically changed and, basically, may be modified according to scheduling information. Both DL and UL may exist in the reference time unit such as a slot and the amount and/or positions of resources used for DL and/or the amount and/or positions of resources used for UL may be flexibly changed according to the scheduling information.

The resource information may be assumed or configured according to the scheduling information, i.e., according to DCI detected by the UE.

For channel measurement and/or interference measurement for a resource, the eNB may indicate information about the resource to the UE regardless of scheduling. In addition, the reference time unit such as a slot may indicate flexible change of numerology according to a service and a scenario. When LBT communication is performed for operation in an unlicensed band or interference management for a neighboring cell is performed, a blank resource may be used in all or a part of the reference time unit such as a slot.

In this case, ambiguity occurs in a DL control region and, thus, an additional method of indicating the DL control region needs to be considered. Therefore, the present invention proposes an embodiment of a method of configuring the reference time unit as follows. That is, information about the reference time unit may include one or more of the following information.

1) DL and/or UL indication information
 2) Information about a starting symbol and/or an ending symbol of a DL resource
 3) Information about a starting symbol and/or an ending symbol of a resource for DL control channel transmission
 4) Information about a starting symbol and/or an ending symbol of a resource for DL data transmission
 5) Information about a starting symbol and/or ending symbol of a guard resource
 6) Information about a starting symbol and/or an ending symbol of a UL resource
 7) Information about a starting symbol and/or an ending symbol of a resource for UL control channel transmission
 8) Information about a starting symbol and/or an ending symbol of a resource for UL data transmission
 9) Type indication information regarding a combination pattern of a DL resource, a guard time, and/or a UL resource
 10) Information about numerology
 11) Information about a starting symbol and/or an ending symbol of a blank resource or information as to whether the blank resource is applied
 12) Information about a beam direction, such as the type and/or number of beam directions within the reference time unit The information about the reference time unit may be information about the reference time unit (i.e., a slot) in which the information is included or may be information about a reference time unit before or after a specific time starting from a timing at which corresponding indication information is transmitted, in consideration of a processing time. Although the indication information may be applied within a single reference time unit, the indication information may be information about a plurality of reference time units in consideration of a varied degree.

The above-described indication information may use type indication information of the reference time unit to indicate that a part of resources for enhanced mobile broadband (eMBB) are preempted by ultra-reliable low latency communication (URLLC).

Specifically, when the type indication information of the reference time unit such as information about a slot is transmitted, information about a previous or current reference time unit may be additionally transmitted. That is, if the information about the reference time unit relates to a current reference time unit, the information about the reference time unit may be transmitted at the last timing of the reference time unit.

When the information about the reference time unit is transmitted, indication information about a slot or a reference time unit to which the information is applied may be additionally included. That is, information indicating that the information about the reference time unit is applied to a previous reference time unit, a current reference time unit, or a reference time unit after a current timing may be additionally included.

For example, slot information up to a corresponding timing from a specific slot may be different from slot information after the corresponding timing. Which resource of eMBB is preempted by URLLC may be indicated to an eMBB UE based on the slot information after the corresponding timing. Herein, the preempted resource may be represented as a blank resource in the slot information.

Considering that the blank resource operates in an unlicensed band or is usable in URLLC, a unit in which the blank resource is represented may be expressed as a mini-slot unit which is shorter than a slot. For example, when N mini-slots are present in one slot, the blank resource may have N or fewer candidates.

Detailed embodiments of a method of representing a preempted resource when a resource for URLLC is preempted will be described below.

1. Embodiment 1-1

A resource for eMBB influenced by URLLC transmission has a single mini-slot or a plurality of mini-slots as a basic unit. In this case, a plurality of mini-slots such as a time duration or numerology may be defined in a corresponding cell. In this case, a channel for transmitting information about a corresponding mini-slot may be present with respect to each mini-slot configuration or a mini-slot referenced when slot information is transmitted may be separately configured. The mini-slot may be represented in units of a specific symbol group including a symbol unit.

2. Embodiment 1-2

The resource for eMBB influenced by URLLC transmission has a single code block or code block group or plural code blocks or code block groups as a basic unit. The number of code blocks may vary in linkage with the size of a transmission block (TB). In this case, the size of information about a channel for transmitting slot information, such as group-common DCI, may also vary.

However, in consideration of PDCCH missing, it may be favorable not to vary the number of code blocks in order to avoid ambiguity. Therefore, the slot information may be configured under the assumption that the number of code block groups is always a maximum number. As another method, the number of code block groups configured through a higher layer may be referenced.

3. Embodiment 1-3

The resource for eMBB influenced by URLLC transmission has a slot as a basic unit. That is, if URLLC is present even in a part of a specific slot, an eMBB UE may always flush all coded bits received in the corresponding slot.

As described above, when indication information regarding a preempted resource is transmitted through the group-common DCI, the group-common DCI including the indication information regarding the preempted resource may be transmitted together with group-common DCI other than the indication information regarding the preempted resource. Then, in a situation in which a resource for DCI transmission is limited, the case in which transmission of other group-common DCI should be reserved in order to transmit the indication information regarding the preempted resource or transmission of the indication information regarding the preempted resource should be reserved for transmission of other group DCI may be prevented or relieved.

Herein, the group-common DCI refers to DCI transmitted equally to one or more grouped UEs among UEs positioned within a specific cell. That is, the group-common DCI may be DCI transmitted commonly to a specific UE group.

Hereinafter, detailed embodiments of DCI for which simultaneous transmission may be considered when the indication information regarding the preempted resource is transmitted will be described.

1. Embodiment 2-1

The indication information regarding the preempted resource may be transmitted together with DCI for scheduling a specific system information block (SIB). In this case, the indication information regarding the preempted resource may be information configured by the eNB. That is, when the indication information regarding the preempted resource is configured, the size of DCI for the specific SIB may be increased or, in an opposite way, a specific field value may be used in order to maintain the size of the DCI.

Specifically, a partial bit for resource allocation may be used for the indication information regarding the preempted resource. It may be assumed that the used bit is a specific value during random access. Notably, in addition to a field for random access, other bit fields, such as transmission power control (TPC) and a reserved field, may be used. In addition, whether the indication information regarding the preempted resource is actually included may be indicated through higher layer signaling or may be indicated by the corresponding DCI, i.e., the DCI for scheduling the specific SIB.

2. Embodiment 2-2

The indication information regarding the preempted resource may be transmitted together with DCI for transmitting TPC for a specific UE group. The indication information regarding the preempted resource may be information configured by the eNB. That is, when the indication information regarding the preempted resource is configured, the size of the DCI may be increased or, conversely, a specific field value may be used in order to maintain the size of the DCI.

Specifically, all of TPC for the specific UE group may be used for the indication information regarding the preempted resource or TPC of all or some specific groups may be compressed from 2 bits to 1 bit and redundant bits secured by compression may be used for the indication information regarding the preempted resource. Whether the indication information regarding the preempted resource is actually included may be indicated through higher layer signaling or may be indicated by the corresponding DCI, i.e., the DCI for transmitting TPC for a specific UE group.

3. Embodiment 2-3

The indication information regarding the preempted resource may be transmitted together with DCI for transmitting UL HARQ-ACK for a specific UE group. The indication information regarding the preempted resource may be configured by the eNB. That is, when the indication information regarding the preempted resource is configured, the size of the DCI may be increased or, conversely, a specific field value may be used in order to maintain the size of the DCI.

Specifically, all of HARQ-ACK for the specific UE group may be used for the indication information regarding the preempted resource. HARQ-ACK may be configured as NACK and/or DTX. Whether the indication information regarding the preempted resource is actually included may be indicated through higher layer signaling or may be indicated by the corresponding DCI, i.e., the DCI for transmitting UL HARQ-ACK for the specific UE group.

A periodicity at which group-common DCI including the indication information regarding the preempted resource is transmitted or monitored may be set to one slot or more. The indication information regarding the preempted resource may be differently configured according to the monitoring periodicity.

Hereinafter, embodiments of a method of configuring the indication information regarding the preempted resource according to the monitoring periodicity will be described.

1. Embodiment 3-1

The indication information regarding the preempted resource may include slot information corresponding to the indication information regarding the preempted resource and information about the preempted resource within an indicated slot, regardless of periodicity.

2. Embodiment 3-2

If the periodicity is set to a specific threshold value or less, the indication information regarding the preempted resource may include information about the preempted resource within a slot region corresponding to the threshold value. In the other cases, i.e., when the periodicity is set to a value exceeding the specific threshold value, the indication information regarding the preempted resource may indicate information about slots corresponding to the indication information regarding the preempted resource and the preempted resource within an indicated slot region.

3. Embodiment 3-3

A configuration type of the indication information regarding the preempted resource may be changed through higher-layer signaling. For example, the indication information regarding the preempted resource may be configured by information about the preempted resource within a specific region according to configuration.

The indication information regarding the preempted resource may include information about slots corresponding to the indication information regarding the preempted resource and information about the preempted resource within an indicated region.

Herein, the information about slots may simply indicate slot indexes within a specific time region or indicate a timing difference between slot units corresponding to the indication information regarding the preempted resource. Alternatively, the information about slots may be represented as a type capable of indicating all slots including the preempted resource within a predetermined time region as in a bitmap scheme. In the above-described case, the information about the preempted resource within a slot may be equally applied to indicated slots. For example, if an N-th symbol group within a slot is indicated as the preempted resource and M-th slot and N-th slot include the preempted resource, all of N-th symbol groups of the M-th slot and N-th slot may be configured as a finally preempted resource.

URLLC transmission may be basically a type of preempting a partial resource of eMBB. Therefore, a channel for transmitting information about the slot and/or a URLLC preemption indicator signal may also be transmitted by overlapping with a URLLC transmission signal. That is, URLLC data and the information about the slot may be transmitted in the same resource region.

Hereinafter, detailed embodiments of operations of the eNB and the UE in the above-described case will be described.

1. Embodiment 4-1

The eNB may prioritize transmission of the URLLC data. That is, the eNB may drop a control channel for transmitting the information about the slot or rate-match and/or puncture a partial resource for transmission of the URLLC data. From the viewpoint of the eMBB UE, reception performance may not be satisfied because even an indication channel is preempted by URLLC. In addition, if the channel for transmitting the information about the slot is dropped, the information about the slot may be delayed to be transmitted in a next slot or a next mini-slot.

2. Embodiment 4-2

The eNB prioritizes transmission of the control channel over the URLLC data channel. In this case, the control channel may include information. Then, transmission of the URLLC data may be delayed and a partial resource may be rate-matched and/or punctured in order to transmit the information about the slot. Information indicating that the partial resource of the URLLC data is rate-matched and/or punctured may indicate all or partial information through URLLC DCI.

Although resource preemption information for URLLC or the information about the slot may be explicitly signaled, the eMBB UE may implicitly provide or indicate the information about the slot by detecting partial information of URLLC. For example, the eMBB UE may receive the eMBB data and simultaneously attempt to detect control information for URLLC and/or a demodulation reference signal (DMRS) for a control channel and a data channel, with respect to each mini-slot.

According to the detection result, the eMBB UE may recognize whether a resource for URLLC has been preempted and flush corrupted coded bits during decoding. However, UEs for eMBB and URLLC may differ. Therefore, in order to effectively perform the above examples, the eMBB UE needs to configure or indicate additional information for receiving a partial channel or signal for another UE.

For example, DCI for URLLC and/or a DMRS may be configured cell-specifically, beam-specifically, or group-commonly without being UE-specifically configured. Candidates for detecting the control information for URLLC and/or the DMRS may be configured for the eMBB UE through higher layer signaling. Alternatively, a candidate group for detecting the control information for URLLC and/or the DMRS may be determined through higher layer signaling and a subset for the candidate group may be indicated again through eMBB DCI. Configuration information regarding the candidates for detecting the control information for URLLC and/or the DMRS may be configured by a combination of a resource on which the DCI and/or the DMRS is transmitted, the length of data, and the length of a sequence.

Figure 9:
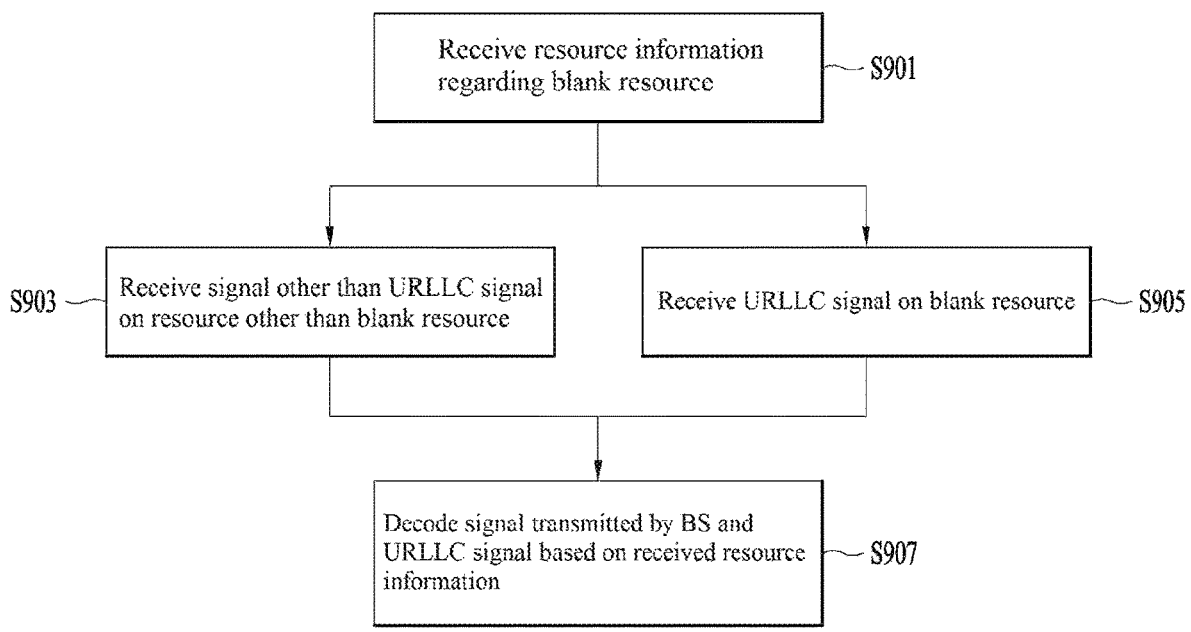
FIG. 9 is a diagram illustrating a method of receiving a signal by a UE, based on resource information, according to an embodiment of the present invention.

As described above, a method of configuring resource information regarding a reference time unit according to the present invention is as follows. Referring to in FIG. 9, the UE receives information about a preempted resource (i.e., information about a blank resource) for URLLC from the eNB (S901), and receives a URLLC signal on the blank resource and receives a specific signal other than the URLLC signal on a resource other than the blank resource, based on the resource information received from the BS (S903 and S905). The UE decodes the received URLLC signal and the specific signal based on the resource information (S907). In this case, the URLLC signal and the specific signal are not always transmitted in one reference time unit. That is, the URLLC signal may be transmitted on the blank resource designated within one reference time and the specific signal may not be transmitted on the resource other than the blank resource. Then, the UE decodes only the URLLC signal based on the resource information. This is equally applied even to the opposite case.

<Method of Transmitting Resource Information Regarding Subframe/Slot/Mini-Slot>

Resource information regarding a specific slot may be indicated through a DL control channel transmitted on a corresponding resource. In this case, the DL control channel may be transmitted on a DL resource of a fixed region per slot. The resource information may be predesignated. Alternatively, the resource information may be configured through higher layer signaling as candidate values for each resource and/or candidate sets for a combination of multiple resources and one or some of the configured candidates may be selected through the DL control channel. However, the above-described method may not be appropriate according to diversity or flexibility of information about a DL resource or information about a blank resource, in a slot.

As a method of improving this problem, the DL control channel may not always be transmitted in every slot. That is, the DL control channel may be transmitted at a preset periodicity, a periodicity configured through a higher layer, or a periodicity configured by another control channel. As another method, the DL control channel may be aperiodically transmitted and a resource type or resource information regarding a slot indicated by one DL control channel may be applied to a plurality of slots.

Specifically, in consideration of a processing time, the resource type or resource information regarding the slot indicated by the DL control channel may be not an indication value for the corresponding slot but an indication value for a slot after a specific time (e.g., the next slot) or for a previous slot (e.g., indication information is transmitted in the end of the corresponding slot or information about the previous slot is indicated) from a timing at which the indication value for the corresponding slot is transmitted. That is, the resource type or resource information regarding the slot indicated by the DL control channel may be information about a slot transmitted after a timing at which the indication value is transmitted or indication information regarding the corresponding slot may be received at the last timing of the corresponding slot and information about a slot before the indication information is transmitted may be indicated.

For example, if a blank resource in a slot is used for interference management, an indication timing of the indication information is meaningful when the indication information indicates a timing prior to a location at which the blank resource is configured.

According to configuration of information about a slot, various methods of transmitting the indication information at a front part of a slot or at a rear part of a slot may be considered. The DL control channel may use an information format capable of scheduling a PDSCH and/or a PUSCH such as DCI or may be a third channel according to additional design.

In consideration of various configuration information regarding a slot, resource information regarding the slot may be transmitted in a subband or carrier different from a subband or carrier in which a URLLC signal is transmitted. In this case, the carrier and/or subband in which indication information regarding a slot resource is to be transmitted through a higher layer may be preconfigured through higher layer signaling.

When resource information regarding a slot is transmitted, a subband or a carrier in which the resource information regarding the slot is transmitted may be included in a specific signal. For example, a specific subband or carrier may be an unlicensed subband or carrier. Accordingly, information about a blank resource may be flexible. In this case, information about a blank resource of a slot may be indicated by another subband or carrier to which the UE is connecting. In this case, a subband or carrier indicating the resource information regarding the slot may belong to a licensed band.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present disclosure described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

In the above-described wireless communication system, while the method of transmitting information about an available resource and the apparatus therefor have been described focusing on an example applied to the 5G NewRAT system, the present invention is applicable to various wireless communication systems in addition to the 5G NewRAT system.

The invention claimed is:

1. A method of receiving a signal from a base station (BS) by a user equipment (UE) in a wireless communication system, the method comprising:
   receiving, from the BS, information related to a blank resource allocated to receive a first signal for a first wireless communication service;
   receiving the first signal on the blank resource and receiving a second signal for a second wireless communication service on a resource other than the blank resource; and
   decoding at least one of the first signal and the second signal based on the information related to the blank resource,
   wherein the information related to the blank resource is transmitted via group-common downlink control information (DCI) which is commonly transmitted to a specific UE group, and
   wherein the group-common DCI includes information related to transmission power control (TPC) for the specific UE group and the information related to the blank resource is indicated by a bit secured by compressing the information about TPC into a predetermined size.

2. The method of claim 1, wherein a resource region to which the information related to the blank resource is applied is configured based on a periodicity at which the UE monitors the group-common DCI.

3. The method of claim 1, wherein, if a reception timing of the information related to the blank resource is equal to a reception timing of the first signal, the first signal is received and the information related to the blank resource is dropped.

4. The method of claim 1, wherein the information about the blank resource includes information related to a position of a starting symbol of the blank resource and a position of an ending symbol of the blank resource.

5. The method of claim 1, wherein the information related to the blank resource is received in a frequency band different from a frequency band in which the first signal is received.

6. The method of claim 1, wherein the first wireless communication service is for ultra-reliable low latency communication (URLLC) and the second wireless communication service is for communication other than URLLC.

7. A user equipment (UE) for receiving a signal transmitted by a base station (BS) in a wireless communication system, the UE comprising:
   a transmitter and a receiver configured to transmit and receive a signal to and from the BS and the specific communication device; and
   a processor connected to the transmitter and receiver to:
   receive, from the BS, information related to a blank resource allocated to receive a first signal for a first wireless communication service,
   receive the first signal on the blank resource and receive a second signal for a second wireless communication service on a resource other than the blank resource, and
   decode the first signal and the second signal based on the information related to the blank resource,
   wherein the information related to the blank resource is transmitted via group-common downlink control information (DCI) which is commonly transmitted to a specific UE group, and
   wherein the group-common DCI includes information related to transmission power control (TPC) for the specific UE group and the information related to the blank resource is indicated by a bit secured by compressing the information about TPC into a predetermined size.

8. The UE of claim 7, wherein a resource region to which the information related to the blank resource is applied is configured based on a periodicity at which the UE monitors the group-common DCI.

9. The UE of claim 7, wherein, if a reception timing of the information about the blank resource is equal to a reception timing of the first signal, the first signal is received and the information about the blank resource is dropped.

10. The UE of claim 7, wherein the information related to the preempted resource includes information about a position of a starting symbol of the blank resource and a position of an ending symbol of the blank resource, for reception of the first signal.

11. The UE of claim 7, wherein the information related to the blank resource is received in a frequency band different from a frequency band in which the first signal is received.

12. The UE of claim 7, wherein the first wireless communication service is for ultra-reliable low latency communication (URLLC) and the second wireless communication service is for communication other than URLLC.

* * * * *